United States Patent

[11] 3,609,376

| [72] | Inventors | Earl S. Seely<br>Boonton;<br>William J. Jauch, Denville, both of N.J. |
|---|---|---|
| [21] | Appl. No. | 39,468 |
| [22] | Filed | May 21, 1970 |
| [45] | Patented | Sept. 28, 1971 |
| [73] | Assignee | RFL Industries, Inc.<br>Boonton, N.J. |

[54] AUTOMATIC CALIBRATING APPARATUS FOR ELECTRICAL INSTRUMENTS
15 Claims, 9 Drawing Figs.

[52] U.S. Cl. ..................................................... 250/215,
324/74, 73/1, 250/209
[51] Int. Cl. ..................................................... G01d 5/34
[50] Field of Search ........................................... 250/215,
231, 208, 209; 324/76; 73/1 R; 148/103, 108

[56] References Cited
UNITED STATES PATENTS

| 2,286,820 | 6/1942 | Lenehan ..................... | 324/74 |
| 2,569,468 | 10/1951 | Gaugler ..................... | 148/108 |
| 3,363,148 | 1/1968 | Freeman ..................... | 250/231 X |
| 3,511,077 | 5/1970 | Rawcliffe ..................... | 73/1 |

*Primary Examiner*—Walter Stolwein
*Attorney*—Rudolph J. Jurick

ABSTRACT: Apparatus for automatically charging and treating the permanent magnet of an electrical instrument having a pointer movable over a preprinted scale. A plurality of photoconductive cells are mounted for positioning along a viewing screen upon which an enlarged image of the instrument scale and pointer are projected. The photocells respond to the light passing through the screen and effect operation of associated circuitry and components for first charging the instrument magnet to saturation and then treating the magnet to final strength such that the instrument thereafter provides an accurate measurement of an electrical voltage applied thereto.

PATENTED SEP28 1971

EARL S. SEELY and
WILLIAM J. JAUCH
INVENTORS

BY
Rudolph L. Lucick
ATTORNEY

AUTOMATIC CALIBRATING APPARATUS FOR ELECTRICAL INSTRUMENTS

BACKGROUND OF THE INVENTION

In the manufacture of electrical devices incorporating a permanent magnet it is customary to charge the magnet to saturation and thereafter to subject the magnet to a demagnetizing force in order to stabilize the magnet and/or set the strength of the magnet to a desired level. Generally, this is done by subjecting the charged magnet to an alternating current flux field of relatively high initial amplitude and then gradually reducing the flux field to zero.

Various forms of apparatus are available for charging and pulling down a permanent magnet. In the case of an electrical indicating instrument having a pointer movable over a scale marked in voltage values, a voltage of predetermined magnitude is applied to the instrument and the magnet is pulled down, or treated, until the pointer is brought into alignment with the scale mark corresponding to the magnitude of such voltage. This procedure, depends upon the visual observance of the pointer position during the magnet-treating operation and, therefore, is time consuming and requires the services of a skilled operator.

Apparatus made in accordance with this invention automatically controls the charging and treating of the permanent magnet of an electrical instrument and is particularly adapted for the rapid calibration of instruments on a production basis.

SUMMARY OF THE INVENTION

A permanent magnet-type electrical instrument, having a pointer movable over a preprinted scale, is supported in a charging fixture and an enlarged image of the pointer and scale is projected onto a ground glass screen. A pivotally mounted support plate carries a plurality of photoconductive cells rotation of said support plate resulting in a simultaneous, sliding movement of the photocells along the surface of the screen. Initially, the spacings between the photocells are adjusted in correspondence with the spacings of selected cardinal lines of the instrument scale. When the apparatus is set into operation, a camming system rotates the support plate until one of the photocells is brought into alignment with a predetermined scale mark, as for example, the top mark, after which a charging current is caused to flow through a charging coil carried by the fixture. The magnitude of the charging current is selected to saturate the magnet. Thereafter, a voltage of predetermined magnitude is applied to the instrument thereby causing the instrument pointer to move upscale. A second photocell, responsive to the upscale movement of the pointer image, conditions the circuitry for pulling down the magnet. The magnet then is pulled down, automatically, until the pointer image is in precise alignment with a predetermined cardinal scale marking, as determined by the actuation of a third photocell, whereby the instrument calibration is completed. A fourth photocell is in position for actuation in the event overtreatment of the magnet has occurred. Suitable switches control the start and operating cycle of the apparatus and the completion of each step in the charging and treating of the magnet is indicated by the energization of individual lamps, thereby notifying the operator the calibration of the instrument is proceeding properly.

An object of this invention is the provision of apparatus for automatically calibrating electrical devices having a permanent magnet.

An object of this invention is the provision of apparatus for use in calibrating an electrical indicating instrument of the permanent magnet type and having a pointer cooperating with a scale, which apparatus automatically charges the magnet to saturation and then demagnetizes the magnet to a predetermined level, thereby to provide integrity of the instrument indications in actual use.

An object of this invention is the provision of apparatus for charging and treating the permanent magnet of an indicating instrument having a pointer movable over a preprinted scale, which apparatus comprises means for projecting an enlarged image of the pointer and scale on a viewing screen, photocells actuated by the pointer image, and means controlled by the photocells for effecting the charging and treating of the magnet in accordance with the positions of the photocells with respect to preselected cardinal marks of the scale.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

BRIEF DESCRIPTION OF THE DRAWINGS

In the drawings wherein like reference characters denote like parts in the several views.

DESCRIPTION OF THE PREFERRED EMBODIMENT

Figure 1:
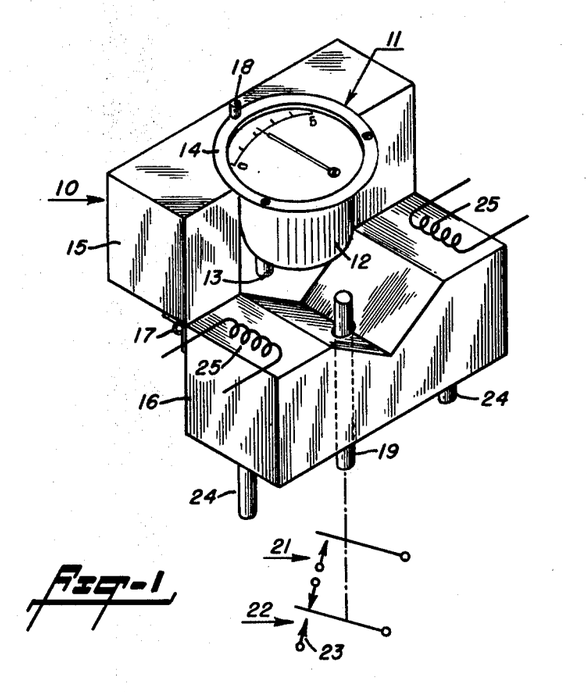
FIG. 1 is an isometric view of one fixture for use with apparatus made in accordance with this invention.

Reference now is made to FIG. 1 showing a fixture 10 for use with a conventional indicating instrument 11 of the panel mounting type, said instrument having a barrel case 12 carrying two terminal studs 13 and a flange 14 provided with three holes for receiving the mounting screws. The fixture comprises the two members 15 and 16 secured together by a hinge 17, the upper fixture member 15 carrying a locating pin 18. Each of the fixture members are provided with complementary V-grooves for accommodating the instrument case. A switch-operating pin 19 extends through an opening formed in the lower fixture member 16. The fixture is shown in the open, or loading position. The instrument, here shown as a voltmeter having a pointer cooperating with a scale marked 0-5 volts, is placed into the upper fixture member with the locating pin 18 passing through one of the mounting holes of the flange. When the fixture is closed, the instrument scale will lie in a vertical plane and the switch-operating pin 19 is depressed by the instrument case. The depression of this pin causes the closure of the contacts of a normally open switch 21 and the transfer of the movable contact of a double-throw switch 22 into engagement with the front contact 23. These two switches are carried by the base of the main apparatus and control the start of the instrument calibration cycle, as will be described hereinbelow. Extending from the lower surface of the fixture are two or more locating pins 24, which pins enter into holes formed in the apparatus base, thereby to locate the fixture and the instrument in a predetermined position. The fixture also carries one or more magnet-charging coils 25 and associated pole pieces, whereby a DC current caused to flow through the coil charges the permanent magnet of the instrument. Fixtures of this type are commonly referred to as magnet charging fixtures and are individually designed for use with a particular electrical device, instrument or etc. Although the invention is described herein with specific reference to the calibration of the illustrated panel instrument, it is here pointed out that the apparatus is adapted for the calibration of any permanent magnet type of device having a member movable relative to a scale or other reference member. Interchangeable fixtures are provided for each type of device to be calibrated.

Figure 2:
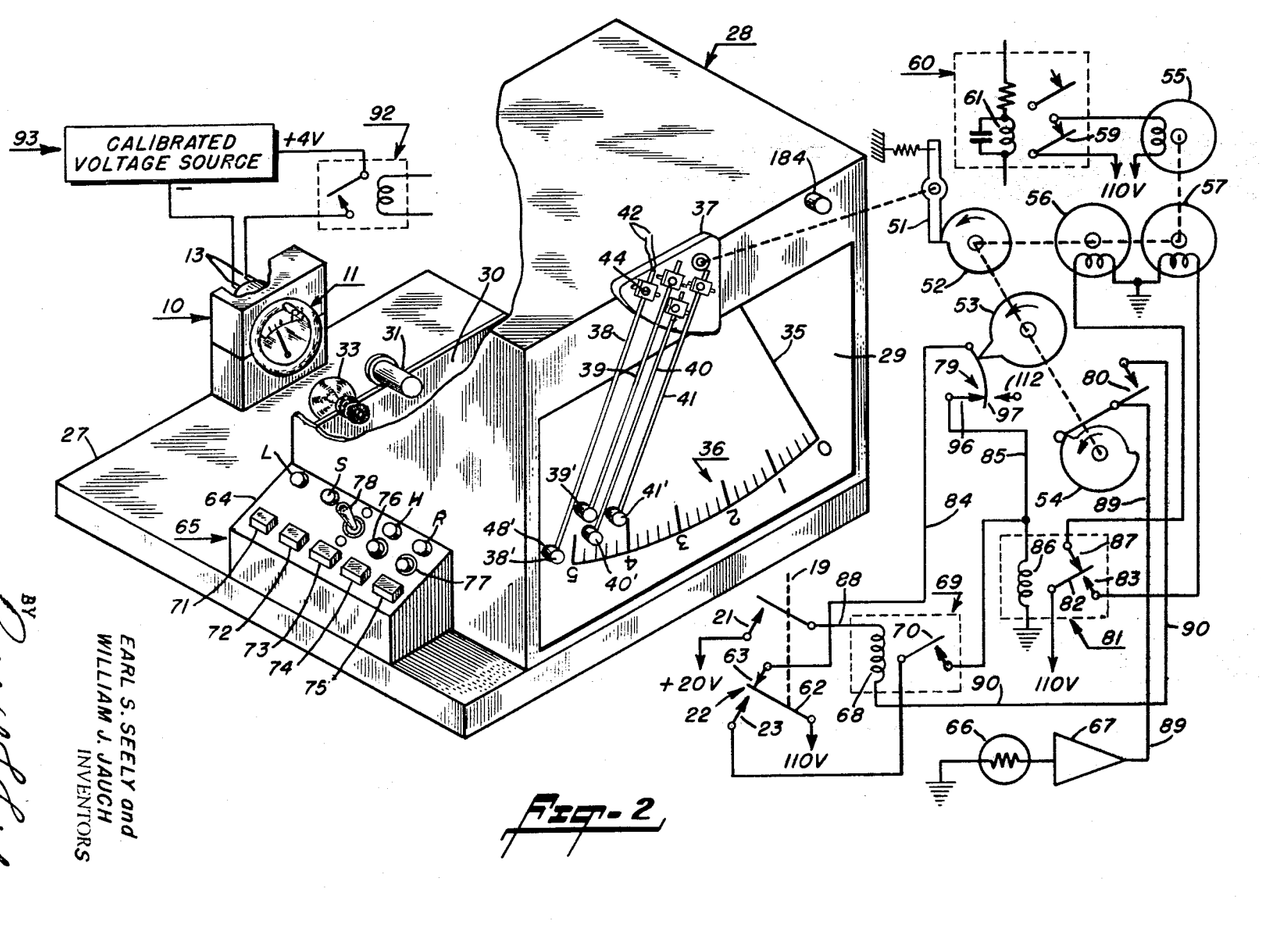
FIG. 2 is a diagrammatic representation showing the apparatus.

Reference now is made to FIG. 2 wherein the instrument 11 is shown supported by the closed fixture 10, which fixture is supported in a predetermined, fixed position on the base 27 by means of the locating pins described hereinabove with reference to FIG. 1. Secured to the base is a generally rectangular housing 28 carrying a ground glass screen 29 at the front end thereof. The other end of this housing is closed by a vertical panel 30 carrying an adjustable lens 31. One or more lamps 33 are carried by such panel and when the lamp or lamps are energized an enlarged image of the instrument pointer and scale is projected onto the screen 29, the pointer and scale images being identified by the numerals 35 and 36, respectively. Pivotally secured to the front wall of the housing is a flat plate 37 carrying the four tubular arms 38–41, the lower ends of these arms having secured thereto the respective photocell housings 38'–41'. Each of the housings 38'–41' carries a photoconductive cell having leads passing through the associated supporting arm as, for example, the leads 42 extending through the tubular arm 38.

Figure 3:
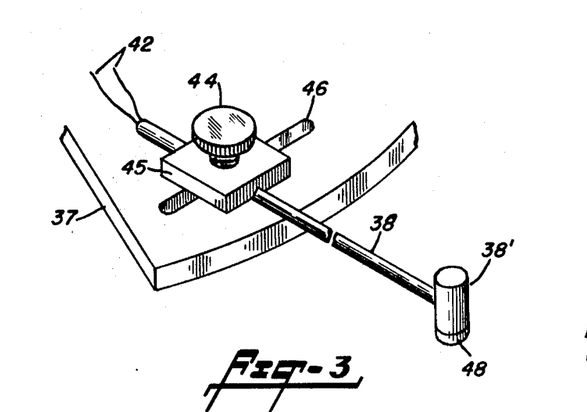
FIG. 3 is a fragmentary, isometric view showing the arrangement for adjustably securing one of the photocells to the pivotally mounted support plate.
Figure 4:
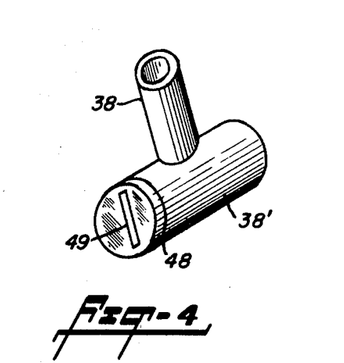
FIG. 4 is an enlarged isometric view taken from the front of the photocell housing.

The arms 38–41 are secured to the plate 37 by means affording individual adjustment thereof, as will now be described with reference to the fragmentary, isometric view of FIG. 3. Here are shown the tubular arm 38, carrying the photocell housing 38', and a portion of the supporting plate 37. A thumb screw 44 has a shank passing through a clearance hole formed in a clamp block 45 and through an elongated slot 46 formed in the plate 37, said clamp block having a V-groove formed in the lower surface thereof. A nut and a spring washer are carried by the threaded end portion of the shank which projects through the plate 37. By loosening the thumbscrew, slightly, the arm 38 can be moved axially along the V-groove, or the clamp block can be rotated about the axis of the thumbscrew, or the clamp block can be moved along the slot 46. This arrangement permits one to position the photocell housing over a desired point on the ground glass screen. The photocell housing includes a cap 48 having a thin, diametrical slot 49 extending through the base thereof, as shown in FIG. 4, the area of such slot being somewhat greater than that of the sensing portion of a photoconductive cell secured in fixed position within the cap. The cap may have a tight fit on the photocell housing, or these parts may be provided with cooperating threads, whereby the cap is angularly adjustable to align the slot along the axis of the tubular arm 38. The other three tubular arms and photocell housings are of similarly construction, and similarly adjustable.

Referring again to FIG. 2, the photocell housings are first manually positioned with reference to the scale image of the particular instrument 10, as follows. The thumbscrew 44 is loosened and the arm 38 is adjusted so that the slot in the cap 48' coincides with image of the top scale mark, namely, the cardinal line having associated therewith the scale mark 5, after which the thumbscrew is tightened. Similarly, the arm 39 is adjusted so that the photocell housing 39' is positioned close to the arm 38 and spaced radially from the scale image. The arm 40 is adjusted so that the slot in the cap of the photocell housing 40' is in precise radial alignment with the image of the cardinal scale line having associated therewith the scale mark 4. Finally, the arm 41 is adjusted so the photocell housing 40' is positioned close to the arm 40. Thus, the slots in all of the photocell housings are oriented to converge at a point corresponding to the radius of the scale arc and the circumferential spacing between the slots in the photocell housings 38' and 40' is equal to that of the cardinal scale lines 4 and 5. The described initial positioning of the photocell housings, relative to each other, remains fixed and the entire photocell assemblage moves as a unit upon rotation of the plate 37, for purposes which will be described hereinbelow.

The pivotally mounted plate 37 is mechanically coupled to a lever 51 which is spring biased into engagement with the peripheral surface of a cam 52. Although not shown in the drawing, the coupling between the plate 37 and the lever 51 is adjustable so that when the lever is in engagement with the high point on the cam, the photocell assemblage occupies the illustrated position, that is, with the photocell housing 38' spaced beyond the top mark of the scale image. The cam 52 and the cams 53 and 54 are secured to a common shaft which is coupled to the drive shaft of a motor 55 through an electromagnetic clutch 56 and an electromagnetic brake 57, said motor being connected to a 110-volt source through the normally closed contacts 59 of a time delay relay 60. As will be described below, with reference to FIG. 5, the operating coil 61, of this relay, is connected in the circuitry of the apparatus in such manner that a voltage is applied thereto when the fixture 10 is open. Normally, the operating cycle of the apparatus is of the order of 15 seconds and the relay 60 has an operating time constant of about 120 seconds. Hence, the motor 55 is deenergized during periods when the fixture 10 remains unloaded, or when the apparatus is not in actual operation, for a period of time exceeding 120 seconds. Also, during such periods of inactivity, the second set of contacts of the time delay relay are opened, thereby deactivating that portion of the apparatus which charges and treats the instrument magnet.

The switches 21 and 22 are disposed below the fixture 10 and positioned within a recess formed in the apparatus base 27. Alternatively, these two switches may be carried by the fixture and connected into the electrical circuit by means of plug-socket connectors. In any event, the particular fixture remains on the base and is opened and closed to replace the instrument 11 with another similar instrument to be calibrated. As has been described hereinabove with reference to FIG. 1, when the fixture is in the illustrated closed position, its switch-operating pin 19 closes the contacts of the normally open switch 21 and, at the same time, moves the movable contact arm 62, of the switch 22, out of engagement with the back contact 63 and into engagement with the front, contact 23. In FIG. 2, the photoconductive cell identified by the numeral 66 is the photocell which is carried by the housing 38' at the end of the tubular arm 38. This photocell is connected to the input circuit of an amplifier 67 which effects the energization of the operating coil 68 of a relay 69 having a pair of normally open contacts 70.

Carried by a panel 64 are a plurality of translucent caps 71–75, overlying individual lamps disposed within the subhousing 65, which lamps become energized in sequence during the normal operating cycle of the apparatus. For purposes of ready identification by the operator, the caps 71–75 carry the respective markings LOCATE, SATURATE, COMPLETE, OVERTREAT AND REJECT. Addition lamps, disposed within the subhousing, underly the circular translucent caps identified by the letters L, S, H and R, which reference letters correspond to the words LOAD, START, HOLD and RESET engraved on the surface of the panel 64. Also, carried by the panel are a pair of normally closed switches having operating pushbuttons 76 and 77, and a four-deck, double-throw switch having an operating lever 78. The functions of these switches, as well as the lamps, will be described hereinbelow with specific reference to FIG. 5.

The cams 52, 53 and 54 are shown in the start, or home, position, in which position the lever 51 is in engagement with the high point of the cam 52, the normally open switch 79 is closed by the lobe of the cam 53, and the pivot switch 80, associated with the cam 54, is open. When power is applied to the apparatus the motor 55 runs continuously as long as the time delay relay 60 is not actuated. The relay 81 controls the coupling of the motor shaft to the shaft carrying the three cams. When this relay is energized, the closure of its contacts 82 and 83 results in the energization of the electromagnetic brake 57 and a deenergization of the clutch 56. This condition occurs when the fixture switch 22, controlled by the operating pin 19, is in its normal position, as illustrated, the circuit being traced as follows; the 110-volt line connected to the closed switch contacts 62 and 63, lead 84, closed contacts of the cam switch 79, lead 85, and the relay operating coil 86 which is connected to the other side of the voltage source through ground. Under this condition, that is, when the fixture 10 is open, the cams will not be rotated. However, with the fixture in the closed position, the contacts 62 and 63 of the fixture switch are open, thereby removing the voltage from the operating coil 86 of the relay 81. Consequently, with the fixture in the illustrated closed position, the contacts 82 and 87, of the relay 81, are closed, whereby the electromagnetic clutch is energized and the brake is deenergized. The cams now rotate and, at the same time, the lamp under the cap S is energized to indicate that the operating cycle of the apparatus has started.

As the cams rotate, the contacts 97 and 96 of the cam switch 79 are opened, the contacts of the pivot switch 80 are closed, and the support plate 37 rotates slowly in a counterclockwise direction. The photoconductive cells, carried by the photocell housings 38'-41' are connected to individual amplifiers which produce output voltages when the ohmic resistance of the associated photocell is high, that is, when the photocell is not exposed to light. With the lamp 33 energized, the intensity of the light passing through the screen and striking the photocells is sufficient to lower their resistance to a value such that output voltages are not provided by the associated amplifiers. Referring specifically to the photoconductive cell 66 carried by the photocell housing 38', when light strikes this photocell the output voltage of the associated amplifier 67 is zero and the relay 81 remains deenergized. However, when the slot in the photocell housing 48' coincides with the image of the scale mark 5, all light is blocked from the photocell and the amplifier 67 produces a DC output voltage resulting in the energization of this relay, the circuit being traced as follows; +20 volts applied to the now-closed contacts of the fixture-actuated switch 21, lead 88, relay coil 68, lead 90, the now-closed contacts of the pivot switch 80, and lead 89. Since the contacts 62 and 23, of the fixture-operated switch 22, are closed, the closure of the relay contacts 70 of the now-energized relay 69 connects the operating coil 86 of the clutch-brake control relay 81 across 110 volts. This results in the deenergizing of the clutch 56 and energizing the brake 57, whereby the cams stop rotating. Thus, the photocell 66 serves to locate the photocell assemblage in proper position relative to the scale image, the initial spacing between the photocells and the orientations of the diametrical slots formed in the photocell housings having already been described. At this time, the light under the LOCATE cap 64 is energized, indicating that the photocell assemblage has been properly located.

Although not shown in FIG. 2, the circuitry of the apparatus causes a charging current to flow through the charging coil, carried by the fixture, after the relay 81 has been energized, that is, when the cams have stopped rotating. The magnitude of the charging is preset to charge the magnet of the particular instrument to saturation. Next, the relay 92 is energized, automatically, thereby applying +4 volts DC to the instrument 11 from a calibrated voltage source 93. Under this condition, if the magnet has been charged to saturation, the image of the instrument pointer will move upscale beyond the photocell carried by the housing 39'. Upon the momentary darkening of this photocell, the lamp under the SATURATE cap 72 is energized, thereby indicating the magnet has been properly charged. In the event the magnet is defective, or has not been fully charged, the instrument pointer will not deflect past the photocell housing 39', and the apparatus will not proceed through the remaining steps leading to the final calibration of the instrument. Under this condition, the lamp under the REJECT cap 75 is energized. In such case, the operator opens the fixture, and replaces the instrument with another one of like type. Upon the opening of the fixture, the fixture-actuated switches 21 and 22 return to their normal, illustrated positions. The opening of the contacts 62 and 23, of the switch 22, opens the circuit between the 110-volt source and the ungrounded side of the operating coil 86 of the clutch-brake control relay 81, so that the movable contact of this relay returns to the illustrated position, whereupon the clutch 56 is energized and the brake 57 is deenergized. The engagement of the contacts 62 and 63 of the switch 22 have no effect upon the operating coil 86, of the relay 81 because at this point in the operating cycle the cam 53 has been rotated to the point where the associated, normally closed switch 79 is open. Thus, the cams now rotate until the lobe on the cam 53 again closes the switch 79, thereby energizing the relay 81 and resulting in the deenergization of the clutch and the energizing of the brake. At this point the photocell assemblage again is in the starting, or home, position. After another instrument has been inserted into the fixture, the closure of the fixture automatically starts a new calibrating cycle.

Assuming now, that the instrument magnet is not defective and has been charged to saturation, the movement of the pointer image past the photocell carried by the photocell housing 39' results not only in the illumination of the SATURATE cap 72 but also in the conditioning of the circuitry for demagnetizing the instrument magnet while the instrument has +4 volts applied thereto. As will be described hereinbelow, a demagnetizing current, caused to flow through the coil carried by the fixture 10, comprises a series of decaying pulse trains having a predetermined initial magnitude, which initial magnitude increases with each succeeding train of pulses. As the magnet is demagnetized, or pulled down, the pointer image slowly moves downscale. It is here pointed out that the spacing between the photocell housings 38' and 40' was initially preset so that the slot in the housing 40' is in radial alignment with the 4 scale mark when the slot in the housing 38' coincides with the 5 scale mark. Consequently, when the pointer image comes into precise alignment with the cardinal scale line 4, it will also be in precise alignment with the diametrical slot in the photocell housing 40', thereby blocking light from the associated photocell. The amplifier associated with this photocell effects the termination of the magnet pull-down operation and the energization of the lamp under the COMPLETE cap 73. The calibration of the instrument now has been completed and it is removed from the fixture. Upon the opening of the fixture, the cams rotate to return the photocell assemblage to the starting position, the circuit for accomplishing this having already been described hereinabove under the condition wherein the instrument magnet is defective or has not been fully charged. Conventional clip-on connectors are provided to facilitate the disconnection of the leads from the instrument terminals 13.

If for any reason the instrument magnet has been overtreated, the pointer image will move downscale beyond the scale mark 4 and will block light from striking the photocell carried by the housing 41'. When this happens, the amplifier associated with this photocell will effect the energization of the lamp under the OVERTREAT cap 74. In such case one would open the fixture causing the cams to rotate to return the photocell assemblage to the starting position and thereby reset the entire system to where it will be ready to process the same meter again upon closure of the fixture. If a meter is overtreated one would have the choice of either removing the meter just rejected from the fixture and processing a new meter or reprocess the rejected meter after making adjustments to the level controls in the magnetreater as may be required. The operation of the apparatus can be stopped, for any reason, by depression of the pushbutton 76.

In the diagrammatic representation of FIG. 2 there are shown only those components necessary for an understanding of the overall operation of the apparatus. The complete circuit diagram of the apparatus is shown in FIG. 5–9.

Figure 5:
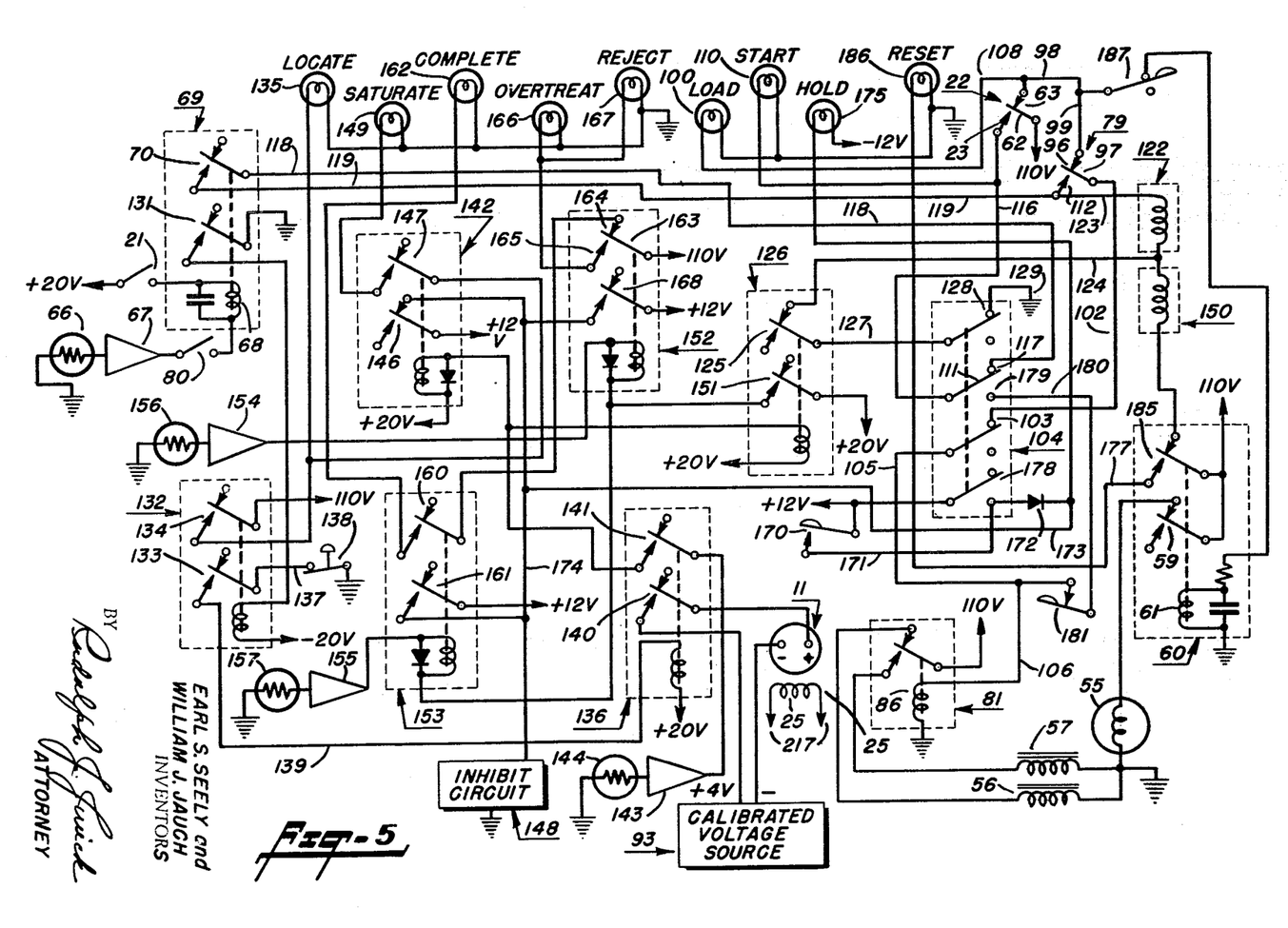
FIG. 5 is a circuit diagram of that portion of the apparatus which controls the charging and treating of the instrument magnet.

Reference first is made to FIG. 5 which is a circuit diagram of that portion of the apparatus which controls the movement of the photocell assemblage and the application of current pulses to the coil 25 of the fixture carrying the instrument 11.

All of the relays are shown in the normal, deenergized positions. The two fixture-actuated switches 21 (upper left corner of the drawing) and 22 (upper right corner) are shown in their normal positions, that is, when the fixture is open. It is assumed that the photocell assemblage is in the home position as shown in FIG. 2. When the apparatus is energized, 110 volts appears on the movable contact 62 of the fixture-actuated switch 22, and the cam drive motor 55 is energized through the normally closed contacts 59 of the time delay relay 60. At the same time, the clutch-brake control relay 81 is energized, the circuit being traced as follows; closed contacts 62 and 63 of the fixture switch 22, leads 98 and 99, the closed contacts 96 and 97 of the cam operated switch 79 (see also FIG. 2), lead 102, normally closed contacts 103 of a manually operable, four-deck switch 104, leads 105 and 106, and the operating coil 86 having one end connected to ground. The energization of the relay 81 results in the deenergization of the clutch 56 and the energization of the brake 57. Consequently, although the motor 55 is running, the cams do not rotate and the photocell assemblage remains in the home position. Also, the normally closed contacts 62 and 63, of the fixture-actuated switch 22, results in the energization of the "Load" lamp 100 through the lead 108. This lamp illuminates the cap H (FIG. 2), thereby indicating that the apparatus is in operating condition and an instrument is to be placed into the fixture. Upon closure of the fixture, the movable contact of the switch 22 engages the normally open fixed contact 23, thereby resulting in the deenergization of the "Load" lamp 100, the energization of the "Start" lamp 110, and the application of 110 volts to the movable contact 110 of the four-deck switch 104. The START lamp 110 illuminates the cap S (FIG. 2), thereby indicating that the instrument calibration cycle has started. The opening of the contacts 62 and 63, of the fixture-actuated switch 22, removes the energizing voltage from the operating coil of the relay 81 and the deenergization of this relay results in the deenergization of the brake 57 and the energization of the clutch 56, thereby resulting in a counterclockwise rotation of the photocell assemblage, as viewed in FIG. 2. Upon the closure of the fixture, the fixture-actuated switch 21 also is closed, thereby connecting one end of the operating coil 68, of the relay 69, to +20 volts. However this relay remains deenergized due to the normally open contacts of the cam-actuated pivot switch 80. (see also FIG. 2).

Shortly after the cams have started rotating, the movable contact 97, of the cam-operated switch 79, moves out of engagement with the back contact 96 and into engagement with the front contact 112 and, at about the same time, the normally open contacts of the cam-operated pivot switch 80 are closed. At this point in the operating cycle, even though the photocell assemblage is moving along the scale image, the relay 69 remains deenergized as light impinges upon the photoconductive cell 66, which photoconductive cell is carried by the photocell housing 38' shown in FIG. 2. The photocell assemblage moves along the scale image until the diametrical slot formed in the photocell housing 38' overlies the image of the scale mark 5, at which time all light is blocked from the photocell and a DC voltage is applied to the operating coil of the relay 69 by the amplifier 67. At this point, reference is made to FIG. 6 which is a circuit diagram of the amplifier associated with the photoconductive cell 66.

Figure 6:
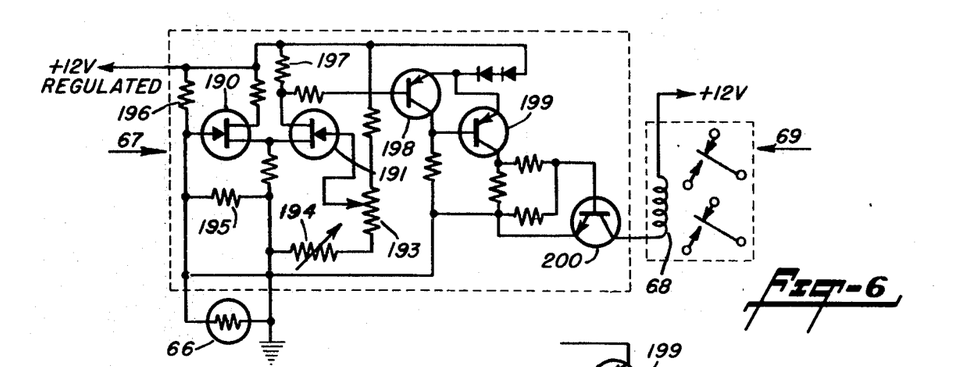
FIG. 6 is a circuit diagram of the nonlatching amplifier associated with one of the photocells.

As shown in FIG. 6, the amplifier 67 comprises a pair of field effect transistors 190 and 191 connected as a differential amplifier, the gate of the transistor 191 being connected to an adjustable voltage divider consisting of the resistors 193 and 194, thereby to provide sensitivity adjustment. The gate of the transistor 190 is biased by a high impedance voltage divider consisting of the resistors 195 and 196, one leg of this divider, namely, the resistor 195, being shunted by the photoconductive cell 66, which cell is carried by the photocell housing 38' shown in FIG. 2. For normal operation, that is, when the instrument to be calibrated has a dark pointer and dark scale markings formed on a light background, the photoconductive cell shunts the resistor 195 when the light is blocked from striking the cell. This causes the gate of the transistor 190 to go positive, thereby decreasing the current flow through the resistor 197. The transistors 198 and 199 are connected to operate as a Schmidt trigger. When the current flowing through the resistor 197 decreases, the voltage on the base of the transistor 198 swings positive through the trip level, thereby resulting in a positive voltage pulse applied to the collector of the transistor 199 and to the base of the output transistor 200. The positive voltage pulse on the base of the transistor 200 causes this transistor to conduct, thereby energizing the operating coil 68 of the relay 69. It may here be pointed out, that when the instrument to be calibrated has a light pointer and light scale markings formed on a dark background the photoconductive cell 66 would be connected across the resistor 196, whereby the relay coil 68 becomes energized when light strikes the cell.

Figures 7, 8:
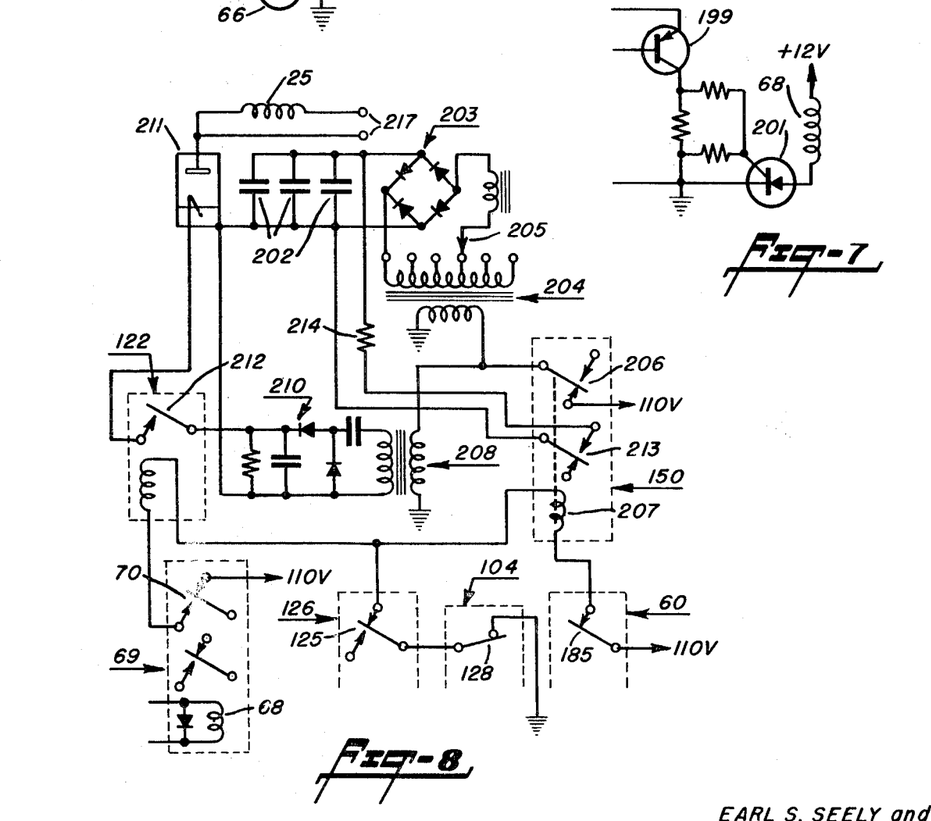
FIG. 7 is a fragmentary circuit diagram of the latching amplifiers which are individually associated with the remaining photocells.
FIG. 8 is a circuit diagram of the magnet-charging circuit.

With continued reference to FIG. 6, the amplifier 67 is of the nonlatching type, that is, the relay coil 68 is energized and deenergized when the photoconductive cell 66 is illuminated and darkened, respectively. The amplifier individually associated with the photoconductive cells carried by the photocell housings 39', 40' and 41' (FIG. 2) each are of the latching type as shown in the fragmentary circuit diagram of FIG. 7. Specifically, and as shown in FIG. 7, the positive voltage pulse appearing on the collector of the Schmidt trigger transistor 199 is applied to the gate of the silicon controlled rectifier 201. When the associated photoconductive cell is darkened the relay coil 68 remains energized since the rectifier does not reset when its gate voltage is decreased. In order to reset the rectifier the gate voltage and the current flowing through the anode must be reduced to near zero. This occurs automatically at the appropriate time in the operating cycle of the apparatus, as will be described hereinbelow with reference to FIG. 5.

Referring back to FIG. 5, the relay 69 is energized the moment that the diametrical slot in the photocell housing 38' coincides with the image of the scale mark 5. The closure of the contacts 70, of the relay 69, results in the application of 110 voltage across the operating coil of the clutch-brake control relay 81, the circuit being traced as follows; closed contacts 62 and 23 of the fixture-actuated switch 22, lead 116, closed contacts 111 and 117 of the four-deck switch 104, lead 118, closed contacts 70 of the relay 69, lead 119, the now-closed contacts 96 and 112 of the cam-operated switch 79, lead 102, closed contacts 103 of the four-deck switch and leads 105 and 106. Thus, immediately upon the energization of the relay 69 the electromagnetic clutch 56 is deenergized and the electromagnetic brake 57 is energized, whereby the photocell assemblage is maintained in the described, fixed position relative to the scale image. At the same time, the closure of the contacts 70, of the relay 69, results in the energization of the operating coil of the relay 122, the circuit being traced as follows; the 110 volts appearing on the closed contacts 70 of the relay 69, lead 119, lead 123, operating coil of the relay 122, lead 124, normally closed contacts 125 of the relay 126, lead 127, normally closed contacts 128 of the four-deck switch 104, and lead 129 connected to ground. The relay 122 is in the magnet charger circuit as will be described with reference to FIG. 7, it here being pointed out that when this relay is energized a DC charging current is caused to flow through the charging coil 25 carried by the fixture supporting the instrument 11 to be calibrated. It will now be assumed the instrument magnet has been charged to saturation.

Referring again to the relay 69, the closure of its contacts 131 results in the energization of the operating coil of the relay 132 having two sets of normally open contacts 133 and 134. Closure of the relay contacts 134 results in the energization of the lamp 135 which illuminates the LOCATE cap shown in FIG. 2, thereby indicating that the photocell assemblage is properly located relative to the scale image. Closure of the relay contacts 133, of the relay 132, results in the energization of the relay 136, the circuit being traced as follows; lead 137 connected to ground through a normally closed reset switch 138, closed relay contacts 133, lead 139, and the operating coil of the relay 136. The relay 136 being energized, its now-closed contacts 140 complete the circuit between the instrument 11 and the calibrated voltage source 93, whereby the image of the instrument pointer deflects upscale. At the same time, the now-closed contacts 141, of the relay 136, connect the operating coils of the relays 142 and 126 to the output circuit of the latching amplifier 143, which amplifier is responsive to the photoconductive cell 144, said photocell being disposed in the photocell housing 39' shown in FIG. 2. If the magnet has been charged to saturation, the pointer image will deflect past the photocell housing 39'. As the pointer image momentarily comes into alignment with the slot formed in the housing, the amplifier 143 produces a DC output voltage which energizes the operating coils of the relays 142 and 126. The now-closed contacts 147, of the relay 142, results in the energization of the lamp 148 through the still-closed contacts 134 of the relay 132. The energization of this lamp illuminates the SATURATE cap 72 shown in FIG. 2, thereby indicating that the instrument magnet has been properly charged. At the same time, the now-open contacts 146, of the relay 142, opens the 12 volt circuit to an inhibit circuit identified by the block 148, which will allow the magnet-treating operation to take place, as will be described with reference to FIG. 7. Also, the opening of the contacts 125, of the relay 126, opens the ground connection to the two magnet charger relays 122 and 150, thereby to prevent their operation during the treatment, or pulling down of the instrument magnet. At the same time, the closure of the contacts 151, of the relay 126, applies +20 volts to one end of the operating coils of the relay 152 and 153. The other ends of these coils are connected in the output circuits of the associated latching amplifiers 154 and 155, respectively. These amplifiers respond to the associated photoconductive cells 156 and 157, which photocells are disposed within the respective photocell housings 40' and 41' shown in FIG. 2. At this point in the operating cycle, light impinges on both of these photocells, whereby the associated relays remain deenergized.

The inhibit circuit 148 now being deactivated, a series of decaying current pulses are applied to the magnet charging and pulldown coil 25 as will be described with reference to FIG. 7, each train of pulses having an increased, initial magnitude. As a result, the strength of the instrument magnet slowly is decreased resulting in a downscale movement of the instrument pointer and the projected pointer image. This treating of the instrument magnet will continue until the pointer image blocks light from reaching the photocell 157, at which point the instrument pointer will be in precise alignment with the cardinal scale mark 4. When this happens, the associated latching amplifier 155 produces an output voltage which energizes the operating coil of the relay 153, thereby closing the relay contacts 160 and 161. The closure of the contacts 160 results in the energization of the lamp 162 through the normally closed contacts 163 and 164 of the still deenergized relay 152, whereas the closure of the relay contacts 161 applies 12 volts to the inhibit circuit 148, thereby terminating the pulling down of the instrument magnet. The energization of the lamp 162 illuminates the COMPLETE cap 73 shown in FIG. 2, thereby indicating the instrument has been properly calibrated and can be removed from the fixture. In the event the magnet has been overtreated, that is, pulled down too far, the pointer image will fall below the image of the scale mark 4 and will block the light from reaching the photocell 156 (carried by the photocell housing 40' shown in FIG. 2), whereupon the associated latching amplifier 154 produces an output voltage which energizes the operating coil of the relay 152. The closure of the relay contacts 163 and 165, of this relay, results in the energization of the lamps 166 and 167, whereas the closure of the relay contacts 168 applies +12 volts to the inhibit circuit 148, thus stopping the magnet-treating phase of the operation. The energized lamps 166 and 167 illuminate the OVERTREAT and REJECT caps 74 and 75 shown in FIG. 2. If, for any reason, it is desired to interrupt the pulling down of the instrument magnet, this can be done by closing the normally open, hold switch 170, the pushbutton for this switch being identified by the numeral 76 in FIG. 2. The closure of this switch applies +12 volts to the inhibit circuit 148 through the lead 171, diode 172 and the leads 173 and 174. During the time when the hold switch 170 is closed, the lamp 175 is energized by the +12 volts appearing on the lead 176 connected to the diode 172. This lamp illuminates the cap identified by the reference letter H in FIG. 2. Upon release of the switch 170 the +12 volts is removed from the inhibit circuit and the pulling down of the instrument magnet continues.

Assuming the instrument 11 has been properly calibrated, the fixture is opened to remove the instrument, whereby the fixture-actuated switch 21 is opened and the fixture-operated switch 22 is returned to its initial position, each of these switches being shown in such normal positions. With the switch 21 open, the supply voltage is removed from the operating coil of the relay 69, thereby resulting in the deenergization of the relays 132 and 81. The deenergization of the relay 132 releases the relay 136, which relay, in turn, releases the relays 142 and 126, and the latter relays, release the relays 153 and 152. Thus, it can be seen that all of the relays become deenergized to prevent further operation of the apparatus unless the fixture is closed with an instrument therein. Furthermore, when the fixture is open, the closed contacts 62 and 63, of the fixture-actuated switch 22, result in the energization of the "Load" lamp 100 and the application of 110 volts to the contact 96 of the cam-operated switch 79. Since, at this time, the contacts 96 and 97 of this switch are open, the clutch-brake control relay 81 is deenergized immediately upon the opening of the fixture, thereby resulting in rotation of the three cams. When the lobe on the cam 53, (see FIG. 2) closes the contacts 96 and 97, of the switch 79, the operating coil of the relay 81 is energized, whereby the clutch 56 (FIG. 5) is deenergized, the brake 57 is energized and the cams stop rotating. The cams and the photocell assemblage have now returned to their starting or home positions. The four-deck, double-throw switch 104 (FIG. 5) is actuated from one to the other position by means of the operating lever 78 shown in FIG. 2 and is used for the purpose of initial calibration of the apparatus for use with specific-type instruments all having identical scales. The above-described operation of the apparatus occurs when this switch is set to the position illustrated in FIG. 5. With the switch set to the other position, a standard instrument, that is, one which is complete in every respect, is placed into the fixture and the fixture then is closed. The optical system of the apparatus is placed into operation to produce an image of the scale and pointer on the ground glass screen. The now-open contacts 128, of the switch 104, disconnects the ground connection to the relays 122 and 150, and the now-closed switch contacts 178 apply +12 volts to the inhibit circuit 148, through the leads 173 and 174, thereby preventing a charging current or a pulldown current from being applied to the coil 25 carried by the fixture. Also, the closed contacts 111 and 179, of the four-deck switch 104, results in the energization of the clutch-brake control relay 81, the circuit being traced as follows; closed contacts 62 and 23 of the fixture-actuated switch 22 (since the fixture now is closed), lead 116, now closed contacts 111 and 179 of the four-deck switch, lead 180, normally closed, manually operable jog switch 181, and leads 182 and 106. Consequently, the photocell assemblage remains in fixed position as long as the jog switch 181' is closed. By momentarily opening and closing the jog switch, the operator can advance the photocell assemblage to any desired position relative to the scale image. The normally closed, reset switch 138, connected between ground and the contacts 133 of the relay 132, provides a means for resetting the relay chain to the initial operating mode and for setting the latching amplifiers, so that the operator can recheck any setting of the amplifier sensitivity controls during his initial calibration of the apparatus. The pushbutton for operating the switch 138 is carried by the front wall of the housing 28 shown in FIG. 2 and is identified by the numeral 184. As has been described hereinabove, an energizing voltage is applied to the time delay relay 60 when power is applied to the apparatus and when the contacts 62 and 63, of the fixture-actuated switch 22, are closed, that is, when the fixture is open. In the event the fixture remains open for more than approximately 120 seconds, the time delay relay is actuated, thereby opening its contacts 59 and deenergizing the motor 55. At the same time the closure of the contacts 185, of this relay results in the energizing of the RESET lamp 186, which lamp illuminates the cap identified by the letter R in FIG. 2. The time delay relay is reset by momentarily opening the normally closed switch 187, the pushbutton of this switch being identified by the numeral 77 in FIG. 2.

Reference now is made to FIG. 8 which is a diagram of the magnet-charging circuit. The capacitors 202 are connected across the output junctions of the rectifier 203 having its input terminals connected to the tapped secondary winding of the transformer 204 through the switch 205. The primary winding of this transformer is energized through the contacts 206 of the relay 150 when the relay operating coil 207 is energized. As as been described hereinabove with reference to FIG. 5, one end of the operating coil 207 is connected to 110 volts through the normally closed contacts 185 of the time delay relay 60. The other end of the coil is connected to ground through the normally closed contacts 125, of the relay 126, and the normally closed contacts 128 of the four-deck switch 104, these conditions prevail when the apparatus is energized for operation. Consequently, the capacitors 202 are charged to a voltage level determined by the setting of the switch 205. At the same time, the transformer 208 together with the rectifier circuit 210 provides the firing voltage for the ignitron 211. As has also been described hereinabove with reference to FIG. 5, the operating coil 68, of the relay 69, is energized when the photocell assemblage has been properly positioned with respect to the scale image, that is, when the photocell housing 38' (FIG. 2) has reached the position where the image of the scale mark 5 blocks light from the photocell 66 carried by this housing. Upon the energization of the coil of the relay 69, (FIG. 5) the closure of its normally open contacts 70 results in the application of 110 volts to one side of the operating coil of the relay 122, the other side of this operating coil being connected to ground through the normally closed contacts 125 of the relay 126 and the normally closed contacts 128 of the four-deck switch 104. Reverting back to FIG. 8, the energization of the operating coil of the relay 122 results in the closure of its normally open contacts 212, thereby firing the ignitron and causing the capacitors 202 to discharge through the charging coil 25, thereby charging the magnet of the instrument under calibration. Assuming the magnet has been charged to saturation, the relay 126 is energized, thereby opening its contacts 125 and resulting in the deenergization of the relays 122 and 150 which, in turn, results in the deenergization of the transformers 204 and 208. Thereafter, the apparatus proceeds with the magnet-treating cycle, as has already been described. The relay 150 also is deenergized when the time delay relay 60 is actuated during standby periods. Upon the deenergization of the relay 150, the closure of its contacts 213 permits the capacitors 202 to discharge through the resistor 214. The charging coil 25 also is shown connected to the terminals 217, which terminals are the output terminals of the magnet-treating circuit to be described with reference to FIG. 9. It is here pointed out that the ignitron prevents the voltage from the magnet-treating circuit from getting back into the magnet-charging circuit. However, during the magnet-charging cycle, a relay in the magnet-treating circuit opens the circuit to the terminals 217, thereby to prevent damage to the magnet-treating circuit by the large charger current passed through the charging coil 25.

Figure 9:
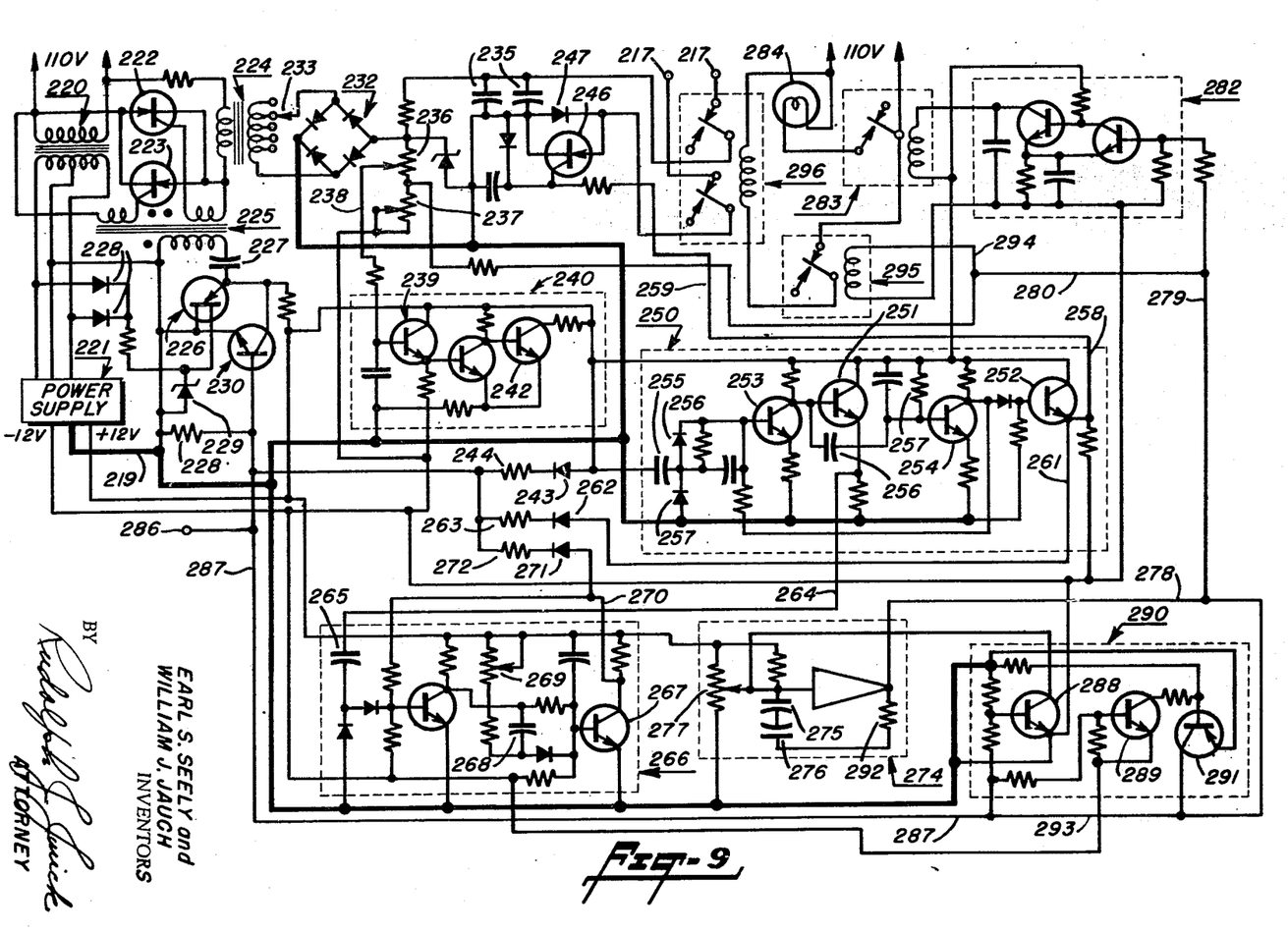
FIG. 9 is a circuit diagram of the magnet-treating circuit.

Reference now is made to the magnet-treating circuit shown in FIG. 9. The power transformer 220 is energized from a 110 volt AC power line upon closure of a suitable line switch, not shown. The voltage developed in the center-tapped secondary winding is applied to a conventional power supply 221 providing +12 and −12 volts with respect to the common lead 219. A pair of silicon controlled rectifiers 222 and 223 are connected in opposite sense between one side of the powerline and one end of the primary winding of a charging transformer 224 the other end of such primary winding being connected to the other side of the powerline through a current-limiting resistor. The gates of the silicon controlled rectifiers are separately connected to the secondary windings of a pulse transformer 225, said transformer having its primary winding connected across the emitter and base-one electrodes of a unijunction transistor 226 through the capacitor 227. The voltages developed in the two halves of the secondary winding of the power transformer are applied to the two base electrodes of the unijunction transistor through the rectifiers 228 and a current-limiting resistor, the maximum magnitude of such applied voltage being determined by the zener diode 229. With +12 volts applied between the emitter and base-two electrodes, the unijunction transistor oscillator and drives the pulse transformer 225, whereby the silicon controlled rectifiers conduct during alternate half cycles of the input voltage.

The collector and emitter electrodes of a normally nonconducting clamping transistor 230 are connected across the emitter and base-two electrodes of the unijunction transistor 226, the base of the transistor 230 being connected to the common lead 219 through a resistor 231. When a positive voltage is applied to its base, the clamping transistor 230 conducts and grounds the emitter of the unijunction transistor, whereby this transistor ceases to oscillate. Positive voltages are applied to the base of the clamping transistor under specific conditions of circuit operation, as will be described.

Normally, the unijunction transistor goes into oscillation upon energization of the circuit, whereby a voltage is developed in the multitapped secondary winding of the charging transformer 224. A rectifier 232 has its input junctions connected to this secondary winding through the switch 233, whereby an AC voltage of predetermined magnitude is applied to the rectifier. The charging capacitors 235 are connected across the output junctions of the rectifier 232. Also connected across the bridge output junctions and −12 volts are a pair of potentiometers 236 and 237. Thus, a DC voltage of predetermined magnitude appears across the lead 238 and the common lead, which voltage is applied to the base of a transistor 239 forming part of a Schmidt trigger 240 having a predetermined triggering voltage. When the voltage applied to the base of the transistor 239 equals the triggering voltage the charging voltage across the capacitors 235 will be at some predetermined level less than the peak value. When the triggering voltage is reached, the normally nonconducting transistor 242 transfers to the conducting state, thereby resulting in the application of +12 volts to the base of the clamping transistor 230 through the diode 243 and resistor 244. This causes the unijunction transistor to cease oscillating, whereby the charging voltage is removed from the capacitors 235. The charging capacitors are connected to the output terminals 217 through the normally closed contacts of a relay 296, the charging coil 25 being connected to these output terminals as shown in FIG. 8. A silicon-controlled rectifier 246 controls the discharge of the capacitors through the charging coil. The diode 247 normally prevents the discharge of the capacitors through the charging coil. When a positive voltage pulse is applied to the gate of the silicon-controlled rectifier 246, this rectifier fires and the capacitors are discharged through the coil. Since the capacitors and the charging coil form a resonant circuit, the current will reverse and charge the capacitors through the diode 247. Consequently, the current flowing through the charging coil has a decaying waveform.

The positive voltage pulse for firing the silicon-controlled rectifier is provided by a gate generator 250 comprising two emitter followers 251 and 252 and a pair of transistors 253 and 254 forming a one-shot multivibrator. The input circuit of the gate generator is coupled to the output circuit of the Schmidt trigger 240 through the capacitor 255 and the diodes 256 and 257. Thus, the output voltage of the Schmidt trigger is differentiated by the capacitor 255, resulting in the application of a sharp voltage pulse to the base of the multivibrator transistor 253. This results in a square wave output voltage pulse appearing in the output circuit of the emitter follower 252, said pulse having a time duration of about 100 milliseconds as determined by the constants of the capacitor 256 and the resistor 257. The square wave output voltage pulse from the emitter follower 252 is applied to the gate of the silicon-controlled rectifier 246 through the leads 258 and 259, thereby allowing the capacitors 235 to discharge through the charging coil. The 100 millisecond period during which the silicon-controlled rectifier is in the conducting state is somewhat longer than the time required for the complete decay of the damped current train flowing through the charging coil. At the same time, this 100 millisecond output voltage pulse is applied to the base of the clamping transistor 230 through the lead 261, diode 262 and resistor 263. Consequently, the unijunction transistor is inhibited from oscillating during the period when the capacitors 235 are discharging.

The emitter of the emitter follower 251 is connected by the lead 264 to the capacitor 265 in the input circuit of a variable delay, one-shot multivibrator 266, thereby to apply to this multivibrator a positive voltage pulse upon the termination of the output voltage pulse provided by the gate generator 250. This positive voltage pulse is differentiated by the capacitor 265 and triggers the multivibrator, thereby resulting in the appearance of a square wave, positive voltage pulse in the output circuit of the multivibrator transistor 267, the time duration of such voltage pulse being determined by the capacitor 268 and the rheostat 269. This positive voltage pulse is applied to the base of the clamping transistor 230 through the lead 270, diode 271 and the resistor 272. Upon the termination of the voltage pulse, the unijunction transistor 226 again goes into oscillation to effect a second charging of the capacitors 235. It will be apparent that the setting of the switch 233, connected to an input junction of the full wave rectifier 232 determines the maximum voltage to which the capacitors 235 will be charged and that the potentiometers 236 and 237 determined the voltage applied to the Schmidt trigger 24.

The ramp generator 274 is an integrating amplifier having the capacitors 275 and 276 connected in the feedback circuit and this generator functions to produce a negative going voltage having a linear ramp waveform and a slope determined by the setting of the potentiometer 277. The output voltage of the ramp generator, appearing on the leads 278, 279 and 280, is applied to the Schmidt trigger 240 through the potentiometers 236 and 237. As the ramp voltage becomes more negative the capacitors 235 will be charged to higher and higher voltage levels before this Schmidt trigger is triggered. This results in a train of current pulses flowing through the charging coil which is connected to the terminals 217, each succeeding current pulse having a higher initial magnitude. The ramp voltage also is applied to the Schmidt trigger 282. The maximum magnitude of the ramp voltage will equal the supply voltage, namely, −12 volts and the Schmidt trigger is set to flip at −11 volts. Thus, just before the ramp generator reaches saturation, this trigger flips, thereby resulting in the energization of the operating coil of the relay 283. Upon closure of the normally open contacts of this relay, the lamp 284 is energized, thereby indicating that the capacitors 235 are to be charged to a higher level in order to pulldown the magnet of the instrument under calibration to the desired level. This is done by adjusting the switch 233 and the potentiometers 236 and 237.

Assuming the capacitors are charged to a proper level, the current pulses flowing through the charging coil 25 (FIG. 5) result in a downscale deflection of the pointer of the instrument 11 and a corresponding deflection of the pointer image, (FIG. 2). At this point in the operating cycle, the photocell, housing 40' (FIG. 2) occupies a position where the diametrical slot in the housing is in radial alignment with the image of the scale mark 4. When the pointer image coincides with such slot, light is blocked from the photocell carried by the photocell housing 40', this particular photocell being identified by the numeral 157 in FIG. 5. The associated latching-type amplifier 155 now effects the energization of the operating coil of the relay 153 and the closure of the contacts 161, of this relay, applies +12 volts to the inhibit circuit 148. It will be noted that +12 volts also is applied to the inhibit circuit through the normally closed contacts 146 of the relay 142. However as has been described hereinabove, the relay 142 is energized after the magnet of the instrument under calibration has been charged to saturation and such relay remains energized throughout the magnet treating operation. The removal of the +12 volts from the inhibit circuit permits the magnet-treating circuit of FIG. 9 to operate as described. When the relay 153 is energized, the instrument magnet has been pulled down to the proper level, the instrument calibration is completed and the closed contacts 161 of this relay maintain the +12 volts on the inhibit circuit, thereby preventing further operation of the magnet-treating circuit until the apparatus has been reset preparatory to the calibration of another instrument.

When +12 volts is applied to the inhibit circuit 148 (FIG. 5) such voltage appears on the terminal 286 of FIG. 9 and is applied to the base of the clamping transistor 230, thereby preventing the unijunction transistor from oscillating. At the same time this voltage is applied, through the lead 287, to the bases of the normally nonconducting transistors 288 and 289 of a clamping circuit 290. The now-conducting transistor 288 connects one side of the ramp generator capacitors 275 and 276 to the common ground lead and the now-conducting transistor 289 causes the normally nonconducting transistor 291 to conduct, thereby connecting the other side of these capacitors to the ground lead through the ramp generator feedback resistor 292. This discharges the capacitors and resets the ramp generator. The +12 volts appearing on the lead 287 also appears on the leads 293, 279 and 294 which results in the energization of the operating coil of a relay 295 having a set of normally closed contacts through which the operating coil of the relay 296 is energized. The now-open contacts of the relay 296 disconnect the capacitors 235 from the terminals 217 to which the charging coil 25 is connected (see FIG. 8). It will now be apparent that when an inhibiting voltage (+12 volts) appears on the terminal 286, the magnet-treating circuit is dormant and disconnected from the charging coil, the latter condition preventing damage to the magnet-treating circuit during operation of the magnet-charging circuit of FIG. 8.

Having now described the invention what we desire to protect by Letters Patent is recited in the following claims.

We claim:

1. Apparatus for automatically charging and treating the permanent magnet of an electrical device of the class having a pointer movable relative to scale markings, said apparatus comprising,
  a. means projecting an image of the pointer and scale markings on a light-permeable screen,
  b. a plurality of photocells mounted for simultaneous movement along a surface of the screen, said photocells being responsive to light passing through the screen,
  c. means controlled by a first photocell and automatically moving the photocells to a predetermined reference position with respect to the image of the scale markings,
  d. means charging the magnet when the photocells are positioned in the said reference position,
  e. means applying a voltage of predetermined magnitude to the said device after the magnet has been charged,
  f. means demagnetizing the magnet in a step-by-step manner after the image of the pointer blocks light from a second photocell, and
  g. means terminating the demagnetizing of the magnet when the image of the pointer blocks light from a third photocell.

2. The invention as recited in claim 1, including a first indicator actuated when the photocells are in the said reference position, a second indicator actuated when the magnet is being demagnetized, and a third indicator actuated when the demagnetizing of the magnet has been terminated.

3. The invention as recited in claim 2, including a fourth indicator actuated when the image of the pointer blocks light from a fourth photocell.

4. The invention as recited in claim 1, wherein the image of one of the scale markings blocks light from the said first photocell when the photocells are in the said reference position.

5. The invention as recited in claim 1, wherein the photocells are disposed within individual housings carried by individual arms which are secured to a pivotally mounted member; and including a relatively narrow slot formed in each of the housings and through which light passes to strike the associated photocell, and means for adjusting each of the said arms axially and angularly with respect to the said pivotally mounted member.

6. The invention as recited in claim 1, wherein the photocells are carried by a pivotally mounted support plate; wherein the said means automatically positioning the photocells in the reference position includes an electric motor having a drive shaft mechanically coupled to the support plate; and including time delay means deenergizing said motor when the fixture is in the said loading position for a predetermined time period.

7. The invention as recited in claim 1, including a fixture for supporting the said device, said fixture being manually operable to a loading position for receiving the said device and to an operating position wherein the said pointer lies in a plane parallel to that of said screen.

8. The invention as recited in claim 7, including switch means actuated by the device supported in the fixture, said switch means being actuated to a first position when the fixture is in the loading position and to a second position when the fixture is in the operative position, means positioning the photocells in a predetermined starting position when the said switch means is in the first position; and wherein the means automatically positioning the photocells in the said reference position is actuated when the said switch means is in the second position.

9. The invention as recited in claim 7, wherein the said means charging the magnet comprises a coil carried by the fixture, a capacitor, means charging the capacitor, and means discharging the capacitor through the said coil when the photocells reach the said reference position.

10. The invention as recited in claim 7, wherein the said means demagnetizing the magnet comprises a coil carried by the fixture, means producing a series of decaying voltage pulses of progressively increasing initial magnet, and means applying the voltage pulses to the said coil after the image of the pointer blocks light from the second photocell.

11. Apparatus for automatically charging and treating the permanent magnet of an electrical instrument having a movable coil carrying a pointer cooperating with a scale, said apparatus comprising,
    a. a light-permeable screen,
    b. a fixture manually operable to a loading position for receiving the instrument and to an operative position wherein the scale of the supported instrument is parallel to the screen,
    c. switch means actuated by the support instrument, said switch means being in a first position when the fixture is in the loading position and in a second position when the fixture is in the operative position,
    d. means projecting an image of the instrument pointer and scale onto the screen,
    e. a plurality of photocells carried by a pivotally mounted member for simultaneous movement along the screen, said photocells being responsive to light passing through the screen,
    f. drive means mechanically coupled to said pivotally mounted member and positioning the photocells in a predetermined starting position when said switch means is in the first position,
    g. means actuating said drive means when said switch means is in the second position,
    h. means terminating actuation of the drive means when a first photocell occupies a position wherein a mark of the scale image blocks light from a first photocell, thereby positioning the photocells in a reference position with respect to the scale image,
    i. means charging the said permanent magnet when the photocells are in the reference position,
    j. means applying a voltage of predetermined magnitude to the said movable coil after the magnet has been charged, thereby causing the pointer image to move upscale along the image of the scale
    k. means demagnetizing the permanent magnet in a step-by-step manner after the pointer image blocks light from a second photocell, and
    l. means terminating the demagnetizing of the permanent magnet when the pointer image blocks light from a third photocell.

12. The invention as recited in claim 11, including a first visual indicator actuated when the photocells are in the reference position, a second visual indicator actuated when the permanent magnet is being demagnetized, and a third visual indicator actuated when the demagnetizing of the magnet has been terminated.

13. The invention as recited in claim 12, including a fourth visual indicator, and means actuating said fourth indicator when the image of the pointer blocks light from a fourth photocell.

14. The invention as recited in claim 11, wherein the said means charging the permanent magnet comprises a coil carried by the fixture, a capacitor, means charging the capacitor, and means terminating the charging of the capacitor and discharging the capacitor through the said coil when the photocells are positioned in the said reference position.

15. The invention as recited in claim 14, wherein the said means demagnetizing the permanent magnet comprises a second capacitor, means alternately charging the second capacitor and discharging it through the said coil as decaying current pulses, means automatically increasing the initial magnitude of succeeding current pulses, and means disconnecting the second capacitor from said coil when the said first capacitor is being charged and discharged.